United States Patent
Misra et al.

(10) Patent No.: US 10,089,712 B2
(45) Date of Patent: Oct. 2, 2018

(54) SYSTEM AND METHOD PROVIDING AUTOMATIC ALIGNMENT OF AERIAL/SATELLITE IMAGERY TO KNOWN GROUND FEATURES

(71) Applicant: ORACLE INTERNATIONAL CORPORATION, Redwood Shores, CA (US)

(72) Inventors: Avishkar Misra, Sammamish, WA (US); Zazhil Ha Herena Ulloa, Zapopan (MX); Juan Carlos Reyes Martinez, Guadalajara (MX); Siva Ravada, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 49 days.

(21) Appl. No.: 15/281,149

(22) Filed: Sep. 30, 2016

(65) Prior Publication Data

US 2018/0096451 A1 Apr. 5, 2018

(51) Int. Cl.
*G06K 9/00* (2006.01)
*G06T 3/00* (2006.01)
(Continued)

(52) U.S. Cl.
CPC .............. *G06T 3/0068* (2013.01); *G06K 9/00* (2013.01); *G06T 5/002* (2013.01); *G06T 5/30* (2013.01);
(Continued)

(58) Field of Classification Search
CPC ............. G06K 9/6202; G06K 9/00201; G06K 9/00637; G06K 9/3233; G06K 9/6292;
(Continued)

(56) References Cited

U.S. PATENT DOCUMENTS

| | | | | |
|---|---|---|---|---|
| 6,512,857 B1 * | 1/2003 | Hsu | ........................... | G06T 7/30 |
| | | | | 382/294 |
| 6,587,601 B1 * | 7/2003 | Hsu | ........................ | G01C 11/00 |
| | | | | 382/154 |

(Continued)

OTHER PUBLICATIONS

Sainath Aher, et al.; A Geomatics of the Image Processing: Image Georefransing; National Technical Symposium on Advancements in Computing Technologies 2011; proceedings published by International Journal of Computer Applications; Article dated Aug. 2012; pp. 20-23; downloaded on Sep. 29, 2016 from: https://www.researchgate.net/publication/265947205.

*Primary Examiner* — Aklilu Woldemariam
(74) *Attorney, Agent, or Firm* — Cooper Legal Group, LLC

(57) ABSTRACT

Systems, methods, and other embodiments are disclosed for correcting errors in the geo-spatial locations of acquired image data. In one embodiment, acquired aerial or satellite image data is segmented to generate extracted boundary data. The extracted boundary data represents boundaries of features of a portion of the Earth's surface, but at incorrect geo-spatial coordinates. The extracted boundary data is matched to expected boundary data derived from ground truth data. The expected boundary data represents boundaries of the features at correct geo-spatial coordinates. Adjustment parameters are generated that represent a geo-spatial misalignment between the extracted boundary data and the expected boundary data. Metadata in a header of the acquired image data is modified to include the adjustment parameters. The adjustment parameters may be applied to the acquired image data to generate corrected image data at correct geo-spatial coordinates.

18 Claims, 10 Drawing Sheets

(51) Int. Cl.
*G06T 7/00* (2017.01)
*G06T 5/00* (2006.01)
*G06T 5/30* (2006.01)
*H04N 5/232* (2006.01)

(52) U.S. Cl.
CPC ....... *G06T 7/0083* (2013.01); *H04N 5/23293* (2013.01); *G06T 2207/10036* (2013.01); *G06T 2207/20036* (2013.01); *G06T 2207/20148* (2013.01); *G06T 2207/30181* (2013.01)

(58) Field of Classification Search
CPC ...... G06K 9/46; G06K 9/0063; G06K 9/4609; G06K 9/4661; G06K 9/48; G06K 9/6215; G06T 2207/10025; G06T 2207/20132; G06T 2207/30181; G06T 2210/22; G06T 3/0068; G06T 3/0093; G06T 7/0028; G06T 7/0065; G06T 7/408; G06T 2207/10021; G06T 2207/10028; G06T 7/11; G06T 7/136; G06T 7/187; G06T 7/593; G06T 2207/10032; G06T 2207/2007; G06T 7/0044; G06T 7/74; G06T 7/002; G06T 7/507; G06T 7/73; G06T 2207/20036; G06T 2207/20061; G06T 2207/20101; G06T 17/05; G06T 3/4038; G06T 1/00; G06T 2200/04; G06T 2207/10012; G06T 2207/30232; G06T 3/0081; G06T 7/2093; G06T 7/292; G06T 7/30; G06T 7/33; G06T 7/35; G06T 7/70; G01C 11/06; G01C 15/00; G01C 11/00; G06F 17/30241; G06F 17/30371; G06F 3/0482; G06F 17/3028; G06F 17/3087; G06F 17/5004; G06F 2217/34; G06Q 50/06; G06Q 50/08; G06Q 50/26; G06Q 10/06; G06Q 10/10; G06Q 30/01; G06Q 10/0631; G09G 5/00

USPC ....... 382/103, 113, 224, 278, 294, 144, 154, 382/289
See application file for complete search history.

(56) References Cited

U.S. PATENT DOCUMENTS

| | | | |
|---|---|---|---|
| 6,597,818 B2 * | 7/2003 | Kumar | G06T 3/0081 382/284 |
| 6,694,064 B1 * | 2/2004 | Benkelman | G06K 9/0063 348/144 |
| 6,757,445 B1 * | 6/2004 | Knopp | G01C 11/06 382/154 |
| 8,761,457 B1 | 6/2014 | Seitz et al. | |
| 9,116,011 B2 * | 8/2015 | Lynch | G01C 21/3638 |
| 9,245,345 B2 * | 1/2016 | Wang | G06T 17/05 |
| 9,679,227 B2 * | 6/2017 | Taylor | G06K 9/6292 |
| 2002/0076105 A1 * | 6/2002 | Lee | G06K 9/44 382/190 |
| 2004/0046774 A1 * | 3/2004 | Rhoads | G06F 17/3028 715/700 |
| 2010/0074538 A1 * | 3/2010 | Mishra | G06K 9/6286 382/224 |
| 2011/0007076 A1 * | 1/2011 | Nielsen | G06F 17/30241 345/441 |
| 2012/0330635 A1 * | 12/2012 | Miga | G06T 7/33 703/11 |
| 2013/0243250 A1 * | 9/2013 | France | G01C 15/00 382/103 |
| 2014/0100900 A1 * | 4/2014 | Abhyanker | H04L 67/18 705/5 |
| 2014/0267775 A1 * | 9/2014 | Lablans | H04N 5/247 348/169 |
| 2015/0347872 A1 * | 12/2015 | Taylor | G01C 11/06 382/224 |

* cited by examiner

SYSTEM AND METHOD PROVIDING AUTOMATIC ALIGNMENT OF AERIAL/SATELLITE IMAGERY TO KNOWN GROUND FEATURES

BACKGROUND

Aerial or satellite imagery can provide a bird's eye view of swaths of land. Multi-spectral images capture information beyond the traditional visible color bands into other spectrums such as infrared or thermal spectrums. The images may be analyzed by human experts to glean important information about the area imaged. The results of such analysis may be used to drive informed decisions as relevant for different applications. For example, a forestry or land-management organization may use aerial images to help identify de-forestation rates. Similarly, farmers may use aerial images to inspect the health of crops through the season and make watering and fertilization decisions for the crops at a daily or weekly cadence. Mapping companies may use aerial images to identify roads, new construction, or changes in the flow of traffic to provide more accurate maps.

Often, acquired images are not accurately mapped to the specific geographical locations. Despite the presence of global positioning system (GPS) information within the image, the image may not align with the known geographical structures such as buildings, farms, roads, or natural landmarks with precise GPS coordinates. Such inaccuracies in location may be due to errors in the image acquisition process, or during a stitching process where multiple images are stitched together into a single larger image. Human experts have to manually correct the errors in alignment in a slow and tedious manual process. The manual process can also be error prone, with different people aligning the images differently. The problem is exacerbated when a large number of images are acquired at a regular cadence to cover large regions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
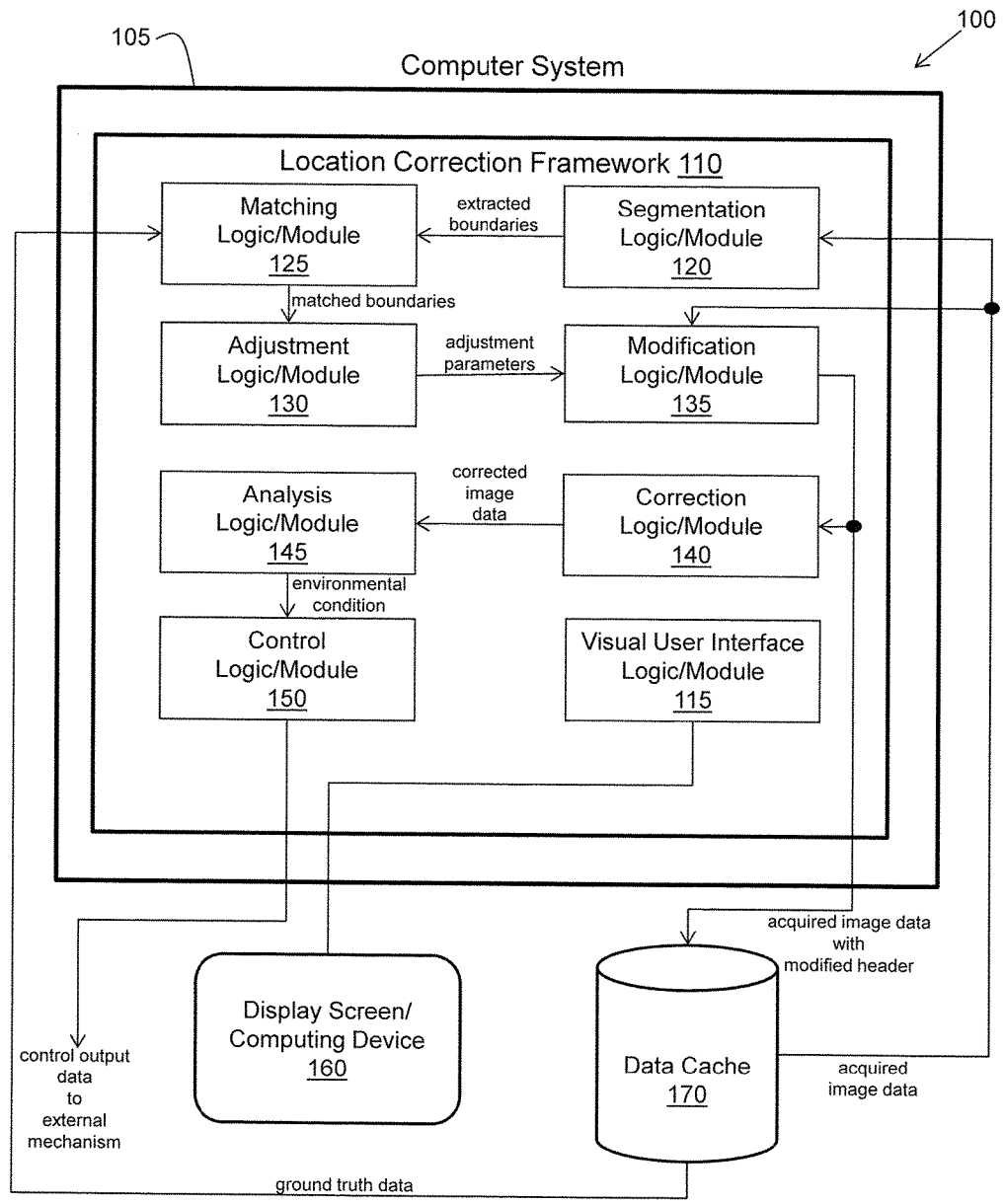
FIG. 1 illustrates one embodiment of a computer system, having a computing device configured with a location correction framework, for at least correcting errors in the geo-spatial locations of acquired image data.

Computerized systems, methods, and other computerized embodiments are disclosed that provide for the automatic correction of acquired image data. Geo-spatial locations of features in ground truth data (reference data) are compared to geo-spatial locations of corresponding features in the acquired image data. The geo-spatial locations of the acquired image data may be corrected based on the comparison. A unique combination of image processing algorithms is used to automatically correct the acquired image data.

Furthermore, once corrected for geo-spatial location, the acquired image data may be automatically analyzed to determine environmental conditions of the Earth's surface corresponding to the acquired image data. Control output data may be automatically generated based on the environmental conditions and used to control an external mechanism to modify the environmental conditions. For example, if an environmental condition is determined to be that of a drought condition in part of a farmer's field, control output data may be generated to control an irrigation system to mitigate the drought condition at correct geo-spatial coordinates.

The following terms are used herein with respect to various embodiments.

The term "acquired image data", as used herein refers to data, representing a portion of the surface of the Earth, as obtained by aerial imaging means or satellite imaging means. Acquired image data includes pixels, where each pixel is represented by, for example, a spectral intensity value and geo-spatial coordinates.

The term "ground truth data", as used herein, refers to data representing a portion of the surface of the Earth at correct geo-spatial coordinates. The geo-spatial coordinates of the ground truth data have been verified as being correct. Ground truth data may be in a form that is similar to acquired image data or may be in a different form such as, for example, grid data which provides a grid of cells representing locations of surface features (e.g., trees) at correct geo-spatial coordinates. Ground truth data may also be in a form that has been pre-processed to include boundaries of features (e.g., buildings, rivers, dams, etc.) at correct geo-spatial coordinates.

The term "feature", as used herein, refers to a geometric representation of a specific structure in image data or ground truth data. Such specific structures may include, for example, buildings, dams, bridges, farm field plots, roads, rivers, airports, etc. A feature may be represented, for example, by a set of pixels in image data, by a set of cells in grid data, or by boundaries in pre-processed ground truth data.

The term "environmental condition", as used herein, refers to a condition of a portion of the surface of the Earth, including natural or man-made conditions. Natural environmental conditions may include, for example, drought conditions, flood conditions, insect infestation conditions, and inadequate crop growth conditions. Man-made environmental conditions may include, for example, traffic conditions, construction conditions, and deforestation conditions. Other environmental conditions are possible as well.

Overview

Errors in an image acquisition process can result in features in acquired image data (e.g., aerial image data or satellite image data) being misaligned with respect to true or known geo-spatial coordinates. Such errors may result in geo-spatial translation, scaling, rotation, or skewing of the acquired image data. In one embodiment, acquired image data is automatically corrected or aligned with respect to known geo-spatial coordinates using a unique combination of image processing techniques.

Depending on the image acquisition system, acquired image data may represent visible spectrum image data, infrared spectrum image data, thermal spectrum image data, or ultraviolet spectrum image data. For example, the visible spectrum image data may be gray-scale image data or red, green, blue (RGB) image data. Other types of spectrum image data are possible as well. Acquired image data represents features on a portion of the surface of the Earth at geo-spatial coordinates, in accordance with one embodiment. Such features may include, for example, buildings, dams, bridges, roads, farm fields, rivers, or any other structure or distinctive geometrical shape that can be represented by the image data. Different spectrums may reveal different environmental conditions of the portion of the surface of the Earth.

Using a combination of unique image processing techniques employed in a computer system, in accordance with one embodiment, geometric structures or features are segmented from acquired image data. The segmented geometric features are matched to geometric features of known locations in ground truth data as part of determining a degree of geo-spatial misalignment. The acquired image data may be adjusted to form corrected image data by correcting the geo-spatial misalignment of the acquired image data such that the features spatially align with known features (i.e., with the ground truth data).

In accordance with one embodiment, once the acquired image data is corrected with respect to geo-spatial location to form corrected image data, the corrected image data may be analyzed to determine an environmental condition associated with the portion of the Earth's surface associated with the corrected image data. The environmental condition may be, for example, a drought condition, an inadequate crop growth condition, an insect infestation condition, a deforestation condition, or a construction condition. Other environmental conditions are possible as well.

In accordance with one embodiment, once the environmental condition is determined, control output data may be generated based on the environmental condition. The control output data may be communicated to an external mechanism to control the external mechanism such that the environmental condition is modified. For example, when the analysis of the corrected image data determines a drought condition in a part of a Farmer's field, control output data may be generated to command an irrigation system to migrate to that part of the Farmer's field and apply water for a specified period of time.

In this manner, a unique combination of image processing techniques is employed in a computer system which provides automated correction of geo-spatial locations in acquired image data, and automated analysis of the corrected image data to control environmental conditions on the surface of the Earth. As a result, many sets of acquired image data can be processed in a minimal amount of time to allow timely modification of, for example, undesirable environmental conditions. The computer system itself is improved to automatically align acquired image data to correct geo-spatial coordinates.

Detailed Description with Respect to the Drawings

FIG. 1 illustrates one embodiment of a computer system 100, having a computing device 105 configured with a location correction framework 110, for at least correcting errors in the geo-spatial locations of acquired image data. Acquired image data may be represented as records or other data structures stored in the computer system 100. In one embodiment, the location correction framework 110 may be part of a larger computer application (e.g., a computerized environmental control application), configured to identify adverse or undesirable environmental conditions represented in a set of acquired image data. The location correction framework 110 is configured to computerize the processes of correcting geo-spatial misalignments in acquired image data and analyzing the corrected acquired image data to determine and modify the undesirable environmental conditions.

In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, the location correction framework 110 is implemented on the computing device 105 and includes logics or modules for implementing and controlling various functional aspects of the location correction framework 110. In one embodiment, location correction framework 110 includes visual user interface logic/module 115, segmentation logic/module 120, matching logic/module 125, adjustment logic/module 130, modification logic/module 135, correction logic/module 140, analysis logic/module 145, and control logic/module 150.

Other embodiments may provide different logics or combinations of logics that provide the same or similar functionality, and control of that functionality, as the location correction framework 110 of FIG. 1. In one embodiment, the location correction framework 110 is an executable application including program modules configured to perform the functions of the logics. The application is stored in a non-transitory computer storage medium. That is, in one embodiment, the logics of the location correction framework 110 are implemented as modules of instructions stored on a computer-readable medium.

The computer system 100 also includes a display screen 160 operably connected to the computing device 105. In accordance with one embodiment, the display screen 160 is implemented to display views of and facilitate user interaction with a graphical user interface (GUI) generated by visual user interface logic 115. The graphical user interface may be used, for example, for controlling user selection of records of acquired image data from a data cache 170, as discussed later herein. The graphical user interface may be associated with a location correction program and visual user interface logic 115 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 160 may represent multiple computing devices/terminals that allow users (e.g., image analysts or environmental control experts) to access and receive services from the location correction framework logic via networked computer communications.

In one embodiment, the computer system 100 further includes data cache 170 operably connected to the computing device 105 and/or a network interface to access the data cache 170 via a network connection. In accordance with one embodiment, the data cache 170 is configured to store sets of acquired image data and ground truth data. The data cache 170 may also store, for example, resultant corrected image data (output data).

Figure 2:
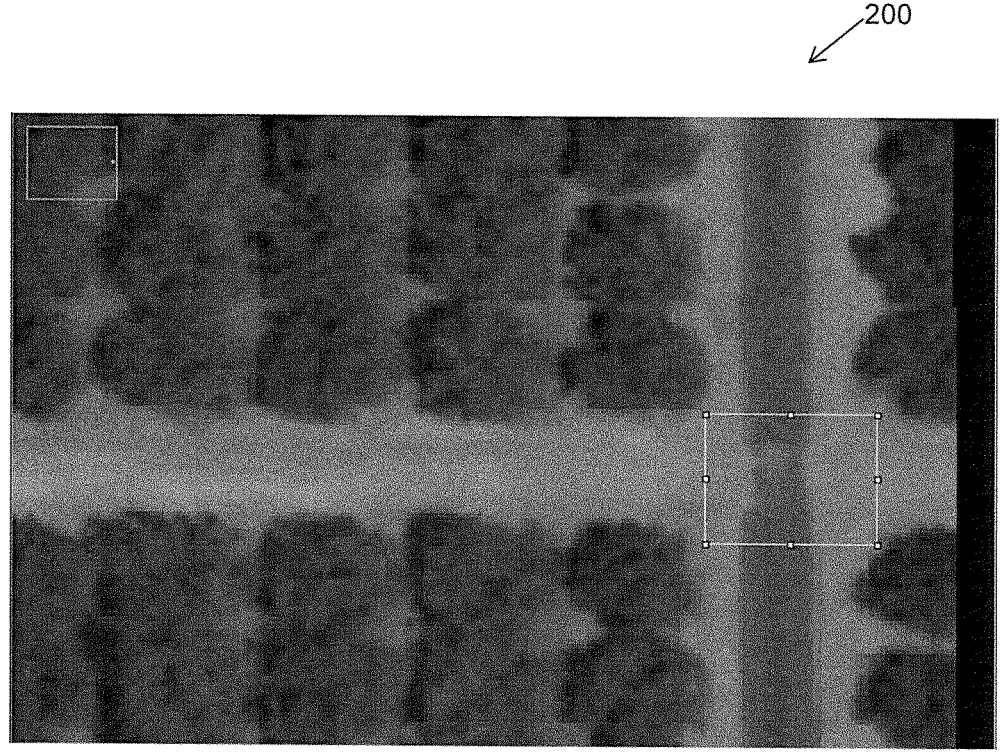
FIG. 2 graphically illustrates an example embodiment of visible spectrum acquired image data that may be stored in a data cache of the computer system of FIG. 1.

FIG. 2 graphically illustrates an example embodiment of visible spectrum acquired image data 200 that may be stored in the data cache 170. The pixels in the acquired image data of FIG. 2 are associated with an intensity attribute representing intensity levels of visible spectrum energy collected by an aerial photographic image acquisition system over a portion of farm, for example. The pixels in the acquired image data 200 are also associated with geo-spatial coordinates (e.g., global positioning system (GPS) coordinates, latitude and longitude (LAT/LONG) coordinates, or universal transverse mercator (UTM) coordinates). However, due to the image acquisition process, the geo-spatial coordinates may be misaligned with the true locations of the features in the acquired image data 200.

Figure 3:
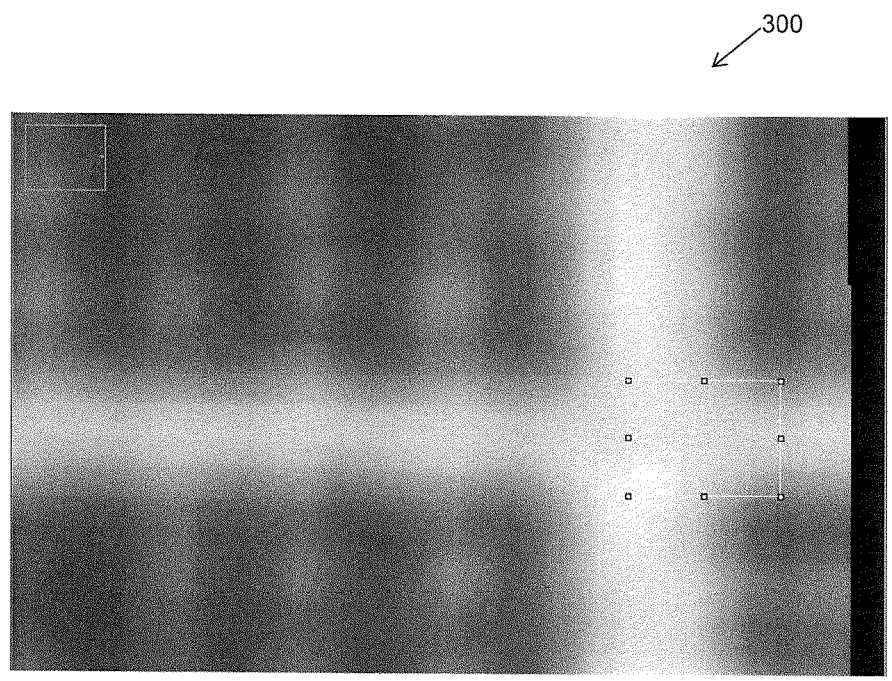
FIG. 3 graphically illustrates an example embodiment of thermal spectrum acquired image data that may be stored in the data cache of the computer system of FIG. 1.

FIG. 3 graphically illustrates an example embodiment of thermal spectrum acquired image data 300 that may be stored in the data cache 170. The pixels in the acquired image data of FIG. 3 may be associated with an intensity attribute representing intensity levels of thermal spectrum energy collected by an aerial thermal image acquisition system over the portion of the farm of FIG. 2. The pixels in the acquired image data 300 are also associated with geo-spatial coordinates (e.g., global positioning system (GPS) coordinates, latitude and longitude (LAT/LONG) coordinates, or universal transverse mercator (UTM) coordinates). However, due to the image acquisition process, the geo-spatial coordinates may be misaligned with the true locations of the features in the acquired image data 300.

Referring back to the logics of the location correction framework 110 of FIG. 1, in one embodiment, visual user interface logic 115 is configured to generate a graphical user interface (GUI) to facilitate user interaction with the location correction framework 110. For example, visual user interface logic 115 includes program code that generates and causes the graphical user interface to be displayed based on an implemented graphical design of the interface. In response to user actions and selections via the GUI, associated aspects of the location correction framework 110 may be manipulated. In one embodiment, visual user interface logic 115 is configured to facilitate user selection of one or more records of acquired image data (with or without a modified header) as discussed later herein.

Referring again to FIG. 1, in one embodiment, the data cache 170 is configured to store records of acquired image data and ground truth data. The records of acquired image data represent portions of the surface of the Earth, as obtained by aerial imaging means or satellite imaging means. Acquired image data includes pixels, where each pixel is represented by, for example, a spectral intensity value and geo-spatial coordinates. The records of ground truth data represent portions of the surface of the Earth at correct geo-spatial coordinates. The geo-spatial coordinates of the ground truth data have been verified as being correct. Ground truth data may be in a form that is similar to acquired image data or may be in a different form such as, for example, grid data which provides a grid of cells representing locations of surface features (e.g., trees) at correct geo-spatial coordinates. Ground truth data may also be in a form that has been pre-processed to include boundaries of features (e.g., buildings, rivers, dams, etc.) at correct geo-spatial coordinates.

In one embodiment, segmentation logic 120 is configured to read a record of acquired image data from the data cache 170 and segment the acquired image data to generate extracted boundary data. The extracted boundary data represents boundaries of features (e.g., buildings, dams, bridges, farm fields, roads, rivers, etc.) represented in the acquired image data. However, the boundaries may be specified as being located at incorrect geo-spatial coordinates, due to geo-spatial errors introduced by the image acquisition process. Such geo-spatial errors may include, for example, translation errors, scaling errors, rotational errors, skewing errors, or some combination of such errors.

In accordance with one embodiment, segmentation logic 120 performs a thresholding operation on the acquired image data to generate thresholded image data. The thresholding operation effectively divides the acquired image data into two or three distinct regions. As one example embodiment, a threshold value is compared to each pixel of the acquired image data to generate binary image data. When the pixel intensity value is at or above the threshold value, the pixel is assigned a highest (e.g., a white) intensity value. When the pixel intensity value is below the threshold value, the pixel is assigned a lowest (e.g., a black) intensity value. In this manner the binary image data has two colors (e.g., white and black).

The threshold value may be adaptive, in accordance with one embodiment. For example, the threshold value may increase or decrease depending on the statistics (e.g., mean and standard deviation) of the pixel intensity values in the acquired image data. In one embodiment, the thresholding operation may employ the Otsu adaptive thresholding algorithm. In another embodiment, the thresholding operation may employ a watershed adaptive thresholding algorithm. Other adaptive thresholding algorithms are possible as well, in accordance with other embodiments.

Furthermore, in accordance with one embodiment, segmentation logic 120 performs at least one morphological operation on the binary image data to generate noise-reduced image data. For example, a sequence of morphological operations may be applied to the binary image data to reduce noise in the binary image data. The morphological operations may include, for example, erosion, dilation, opening, closing, morphological gradient, top hat, and black hat. Other morphological operations are possible as well, in accordance with other embodiments.

Also, in accordance with one embodiment, segmentation logic 120 performs at least one edge detection operation on the noise-reduced image data to generate the extracted boundary data. An edge detection operation may use the Canny algorithm, the Deriche algorithm, the Differential algorithm, the Sobel algorithm, the Prewitt algorithm, or the Roberts cross algorithm, for example. Furthermore, in accordance with one embodiment, a connected components algorithm may be used to link regions of a same color as a bounded region or a polygonal shape. Boundaries may be extracted (extracted boundary data) from the bounded regions or polygonal shapes by applying standard mathematical operations or Cartesian math.

In one embodiment, matching logic 125 is configured to receive the extracted boundary data from segmentation logic 120, and receive the ground truth data from the data cache 170. Matching logic 125 is configured to derive expected boundary data from the ground truth data. The expected boundary data represents the boundaries of features in the acquired image data at geo-spatial coordinates that have been verified to be correct. In one embodiment, the ground truth data directly includes the expected boundary data. In another embodiment, matching logic 125 is configured to extract the expected boundary data from the ground truth data, for example, in a similar manner to how the extracted boundary data is extracted from the acquired image data by segmentation logic 120 (e.g., by employing thresholding, noise reduction, and edge detection).

Furthermore, in accordance with one embodiment, matching logic 125 is configured to match the extracted boundary data to the expected boundary data derived from the set of ground truth data. Template matching techniques (also known as point correspondence or alignment correspondence techniques) are used to perform the matching. Examples of template matching techniques include nearest-point and least-squares. Such techniques often use an iterative optimization method that reduces an error in alignment such as, for example, a least-squared error or an r-squared error. Matching logic 125 is configured to output the extracted boundary data and the matching expected boundary data.

Other embodiments use an average of points or voting mechanisms such as the random sample consensus (RANSAC) algorithm which tries to fit across multiple points. A template can be based on features or characteristics for the template and the object to be matched. In one embodiment, a rectangular template is used. However, the concept can be extended to defined point features, image textures, or colors, for example. In one embodiment, matching is based on nearest points in the (x, y) domain as a translation operation. However, other embodiments may attempt to minimize the error by considering the rotation, scale, and skew of the object with respect to the template.

In one embodiment, adjustment logic 130 is configured to receive the extracted boundary data and the expected boundary data, that matches the extracted boundary data, from matching logic 125. The extracted boundary data and the expected boundary data together are also known herein as matched boundary data. Adjustment logic 130 is also configured to operate on the matched boundary data to estimate adjustment parameters. The adjustment parameters represent an amount and a type of geo-spatial misalignment between the extracted boundary data and the corresponding expected boundary data (i.e., between the matched boundary data). As a result, the adjustment parameters are an indication of how the acquired image data may be corrected (e.g., by correction logic 140) to mitigate the misalignment.

The geo-spatial misalignment may be due to a spatial translation error, a spatial scaling error, a spatial rotational error, or a spatial skewing error in the geo-spatial coordinates of the acquired image data. A translation error corresponds to a misalignment due to an (x, y) displacement. A scaling error corresponds to a misalignment due to a size difference. A rotational error corresponds to a misalignment due to an angular displacement. A skewing error corresponds to a misalignment due to a slanting displacement.

In one embodiment, modification logic 135 is configured to receive the adjustment parameters from adjustment logic 130 and the corresponding acquired image data from the data cache 170 (or alternatively from segmentation logic 120). A record of acquired image data includes a header having metadata. Modification logic 135 is configured to modify the metadata in the header of the acquired image data to include the adjustment parameters. The acquired image data, having the modified header, may then be stored in the data cache 170. In one embodiment, the original record of the acquired image data is replaced with an updated record of the acquired image data which has the modified header data. In another embodiment, the original record of the acquired image data is maintained in the data cache 170 and a new record of the acquired image data, which has the modified header data, is created and stored in the data cache 170.

In one embodiment, correction logic 140 is configured to receive the acquired image data, having the modified header, from modification logic 135. Furthermore, correction logic 140 is configured to apply the adjustment parameters from the modified header to the acquired image data to generate corrected image data at corrected geo-spatial coordinates to mitigate the geo-spatial misalignment. The process of applying the adjustment parameters to the acquired image data to correct the geo-spatial coordinates depends on the type of misalignment (e.g., translation, scaling, rotational, skew). Therefore, geometric transformations of translation, scaling, rotation, affine transformation, or perspective transformation may be applied to the acquired image data using the adjustment parameters. Other types of transformations may be possible as well, in accordance with other embodiments.

In one embodiment, analysis logic 145 is configured to receive the corrected image data from correction logic 140. Furthermore, analysis logic 145 is configured to analyze the corrected image data to determine at least one environmental condition of the portion of the Earth's surface corresponding to the correct geo-spatial coordinates of the corrected image data. Various analytical algorithms may be applied to the corrected image data to determine environmental conditions associated with, for example, drought, inadequate crop growth, insect infestation, traffic congestion on roads, deforestation, and construction. Other types of environmental conditions may be determined as well, in accordance with other embodiments. In one embodiment, as part of analyzing the corrected image data, analysis logic 145 compares the corrected image data to other image data (e.g., acquired from the same portion of the surface of the Earth, but at previous times).

For example, to determine a drought condition, analysis logic 145 may compare the corrected image data to image data of the same area (a farmer's field) acquired last year when drought conditions were known to not exist. To determine an inadequate crop growth condition, analysis logic 145 may compare one part of the corrected image data (e.g., of the farmer's field) to another part of the corrected image data. Large differences between the two parts of the corrected image data may indicate inadequate crop growth in the one part or the other part of the farmer's field.

As another example, to determine an insect infestation condition, analysis logic 145 may analyze the spectral intensity levels across the corrected image data. A variance in the spectral intensity levels that is above a specified threshold value may indicate an insect infestation (e.g., in the farmer's field). To determine a traffic congestion condition, analysis logic 145 may analyze the mean and variance of the spectral intensity levels along a road in the corrected image data. A mathematical combination of the mean and variance that yields a value above a specified threshold value may indicate traffic congestion (e.g., on a highway going into a major city).

As yet another example, to determine a deforestation condition (e.g., the progress of deforestation in a forested area), analysis logic 145 may compare the corrected image data to image data of the same area (the forested area) acquired six months ago when a known level of deforestation existed. To determine a construction condition, analysis logic 145 may look for specific features in the corrected image data which are indicative of man-made structures. For example, analysis logic 145 may find evidence of a man-made structure in a part of a national park where no made-made structures are allowed to be built.

In one embodiment, control logic 150 is configured to receive environmental condition data from analysis logic 145. The environmental condition data may include the type of environmental condition (e.g., drought, fire, traffic congestion, etc.) and the correct geo-spatial coordinates where the environmental condition is occurring. Furthermore, control logic is configured to generate control output data based on the environmental condition data and control at least one external mechanism, by communicating the control output data to the external mechanism, to modify the environmental condition.

For example, the external mechanism may be an irrigation system configured to apply water, in response to the control output data, to crops at correct geo-spatial coordinates in a farm field, as represented by the corrected image data, to mitigate a drought condition. Alternatively, the external mechanism may be an aerial drone configured to apply fertilizer, in response to the control output data, to crops at correct geo-spatial coordinates in a farm field, as represented by the corrected image data, to mitigate an inadequate crop growth condition.

As another example, the external mechanism may be an aerial drone configured to apply pesticide, in response to the control output data, to crops at correct geo-spatial coordinates in a farm field, as represented by the corrected image data, to mitigate an insect infestation condition. Alternatively, the external mechanism may be a traffic signal device configured to control traffic flow, in response to the control output data, at correct geo-spatial coordinates along a heavily used road, as represented by the corrected image data, to mitigate a traffic congestion condition.

As yet another example, the external mechanism may be a law enforcement vehicle configured to navigate to, in response to the control output data, correct geo-spatial coordinates in a forest, as represented by the corrected image data, to halt an illegal deforestation condition. Alternatively, the external mechanism may be a military aircraft configured to navigate to, in response to the control output data, correct geo-spatial coordinates of an enemy site, as represented by the corrected image data, to bomb a military installation that is under construction. Other scenarios to control other types of external mechanisms to modify other environmental conditions are possible as well, in accordance with other embodiments.

In this manner, the location correction framework 110 of the computer system 100 of FIG. 1 is able to automatically correct geo-spatial errors in acquired aerial or satellite image data, automatically analyze the corrected image data to determine environmental conditions, and automatically control external mechanisms to modify the environmental conditions.

Figure 4:
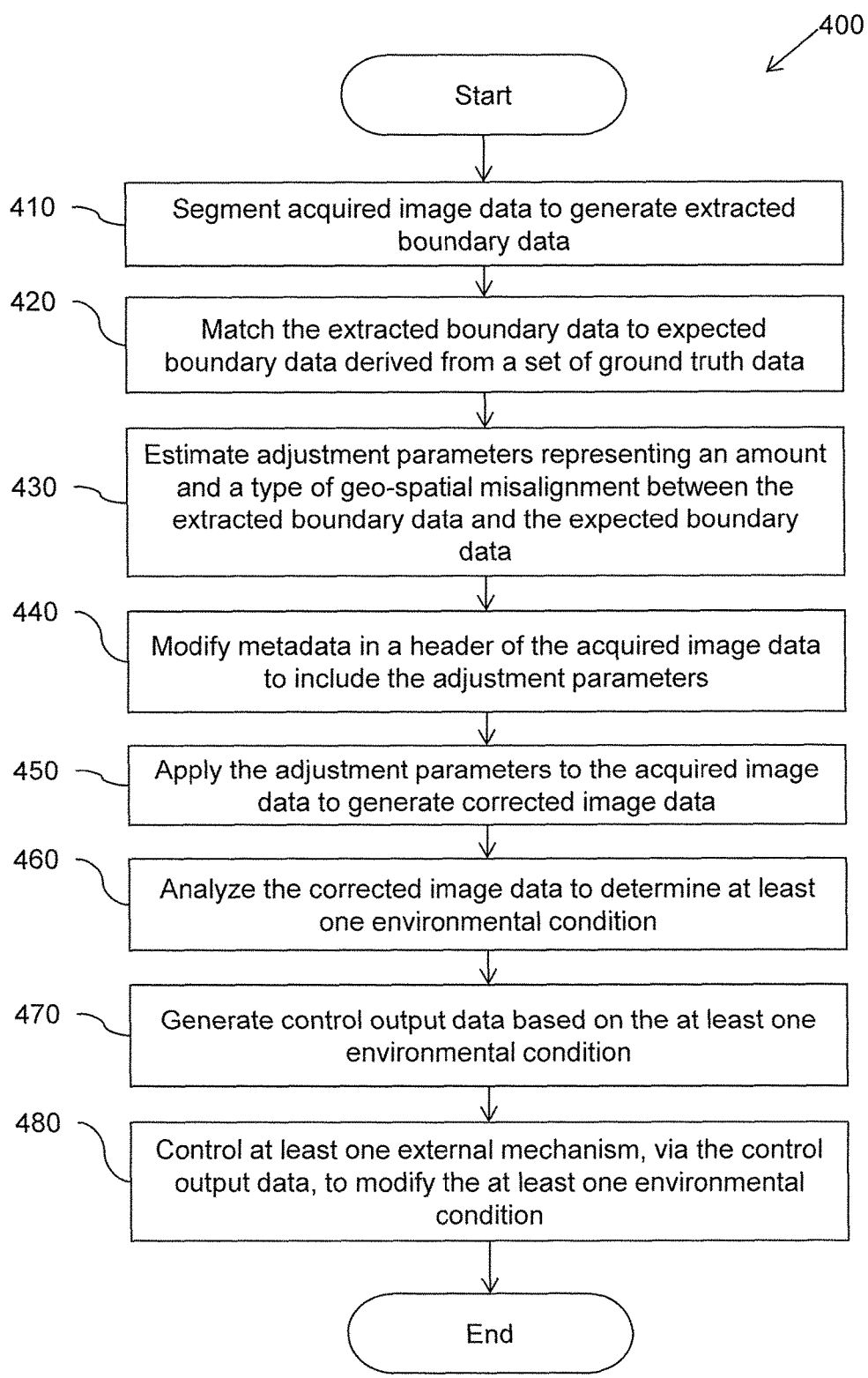
FIG. 4 illustrates one embodiment of a method, which can be performed by the location correction framework of the computer system of FIG. 1, at least to correct errors in the geo-spatial locations of acquired image data.

FIG. 4 illustrates one embodiment of a method 400, which can be performed by the location correction framework 110 of the computer system 100 of FIG. 1, at least to correct errors in the geo-spatial locations of acquired image data. Method 400 describes operations of the location correction framework 110 and is implemented to be performed by the location correction framework 110 of FIG. 1, or by a computing device configured with a program code of the method 400. For example, in one embodiment, method 400 is implemented by a computing device configured to execute a computer application. The computer application is configured to process data in electronic form and includes stored executable instructions that perform the functions of method 400.

Method 400 will be described from the perspective that, when aerial or satellite images are acquired, the geo-spatial locations of features in the images may be in error due to anomalies caused by the image acquisition process. The images can be translated, scaled, rotated, or skewed with respect to true geo-spatial coordinates, for example. Geo-spatial coordinates may be in the form of, for example, GPS coordinates, latitude and longitude coordinates, or UTM coordinates. A unique combination of image processing techniques can be employed to correct the acquired images for such errors in geo-spatial locations.

Upon initiating method 400, at block 410, acquired image data is segmented to generate extracted boundary data. The acquired image data is one of aerial image data or satellite image data representing features of a portion of the surface of the Earth, but at incorrect geo-spatial coordinates. The extracted boundary data represents boundaries of the features at the incorrect geo-spatial coordinates. The acquired image data may be segmented using at least the thresholding, morphological, and edge detection operations previously discussed herein with respect to FIG. 1. In one embodiment, segmentation logic 120 performs the segmenting of the acquired image data as previously discussed herein with respect to FIG. 1.

Figure 5:
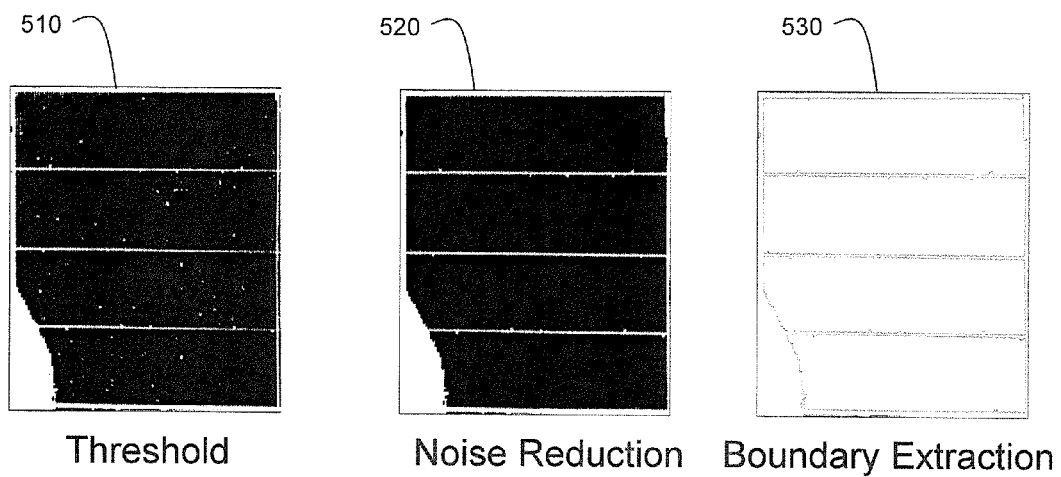
FIG. 5 illustrates one embodiment of a segmentation process performed on acquired image data as part of the method of FIG. 4.

FIG. 5 illustrates one embodiment of the segmentation process performed at block 410 on acquired image data. The acquired image data corresponds to thermal spectrum data of a farm field. Image 510 represents binary image data after applying a thresholding process to the acquired image data as previously discussed herein with respect to FIG. 1. Image 520 represents noise-reduced image data after applying a morphological process to the binary image data represented by the image 510 as previously discussed herein with respect to FIG. 1. Image 530 represents extracted boundary data after applying at least an edge detection process to the noise-reduced image data of the image 520 as previously discussed herein with respect to FIG. 1.

At block 420, the extracted boundary data from block 410 is matched to expected boundary data derived from a set of ground truth data. The expected boundary data represents the boundaries of the features in the acquired image data, but at correct geo-spatial coordinates. In one embodiment, matching logic 125 performs the matching of the extracted boundary data to the expected boundary data as previously discussed herein with respect to FIG. 1. For example, the matching process at block 420 may include a nearest point process, a least-squares process, or a random sample consensus process.

Figure 6:
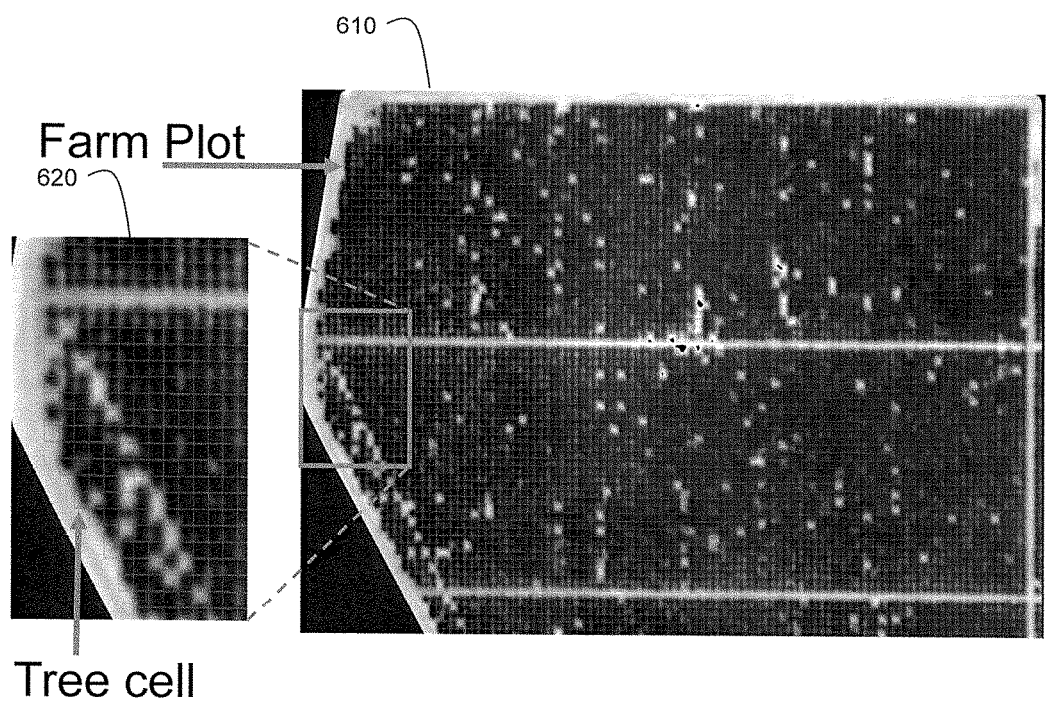
FIG. 6 illustrates one embodiment of an image of a farm plot represented by grid data, derived from a set of ground truth data, which is overlaid onto acquired thermal image data of the farm plot.
Figure 7:
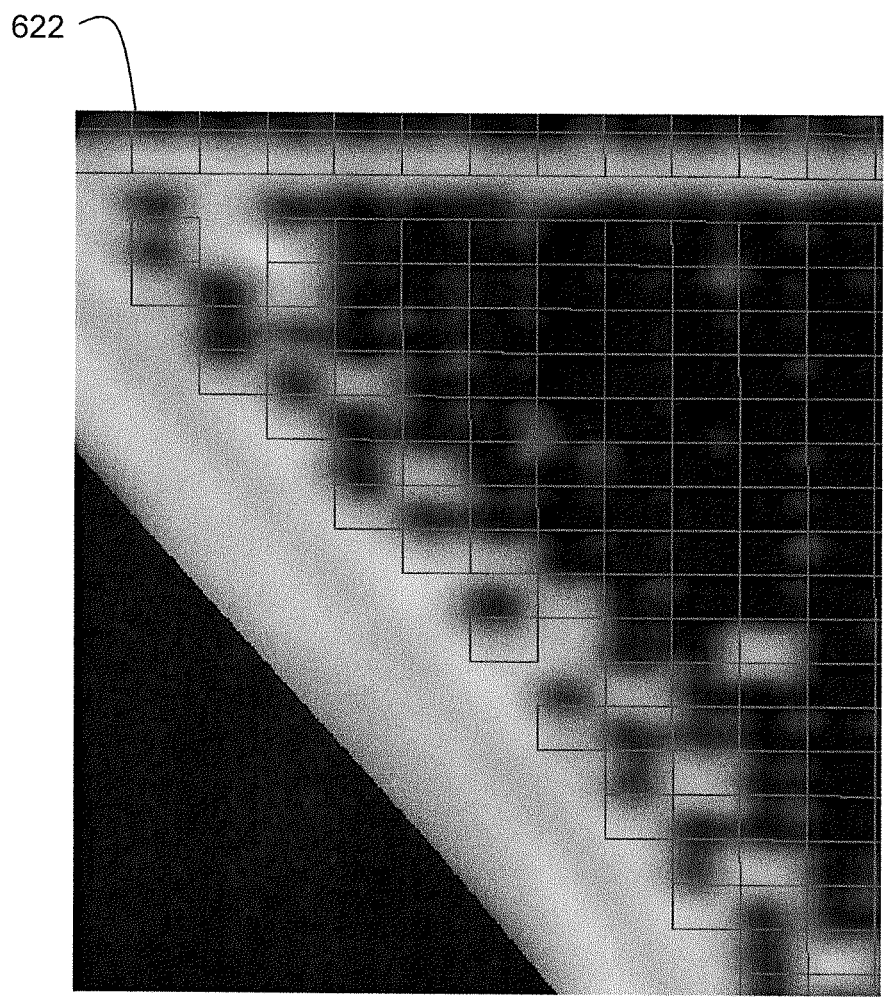
FIG. 7 illustrates one embodiment of a blown-up portion of the image of FIG. 6.

FIG. 6 illustrates one embodiment of an image 610 of a farm plot (e.g., an orchard) representing grid data (a type of expected boundary data), derived from a set of ground truth data, which is overlaid onto acquired thermal image data of the farm plot. The dark portions of the acquired thermal image data represent trees of the farm plot. As can be seen in the blown-up portion 620 in FIG. 6, the cells of the grid data do not align with the dark portions (trees) represented in the acquired thermal image data. Therefore, there is geo-spatial misalignment between the ground truth data and the acquired thermal image data. The misalignment can be seen even more clearly in the further blown-up portion 622 of FIG. 7. The geo-spatial misalignment may be due to, for example, a translation error introduced by the image acquisition process.

Figure 8:
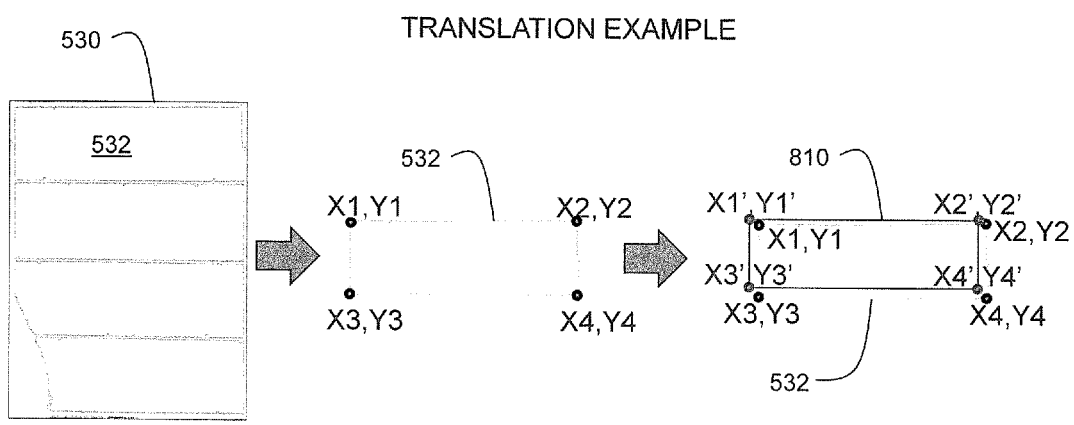
FIG. 8 illustrates an example embodiment of geo-spatial misalignment between expected boundary data and extracted boundary data.

At block 430, adjustment parameters are estimated which represent an amount and a type of geo-spatial misalignment between the extracted boundary data and the expected boundary data. FIG. 8 illustrates an example embodiment of geo-spatial misalignment between expected boundary data and extracted boundary data. In FIG. 8, the image 530 from FIG. 5, representing extracted boundary data from a farm field, is shown. The image 530 is divided into four (4) portions representing plots of the farm field. One portion 532 of the extracted boundary data, representing a single plot of the farm field, is used for illustrative purposes. The portion 532 is of a largely rectangular shape having corners at incorrect (due to acquisition errors) geo-spatial coordinates (X1, Y1), (X2, Y2), (X3, Y3), and (X4, Y4).

Also shown in FIG. 8 is expected boundary data 810, derived from ground truth data, which corresponds to the portion 532 representing the single plot of the farm field, but at correct geo-spatial coordinates (X1', Y1'), (X2', Y2'), (X3', Y3'), and (X4', Y4'). The expected boundary data 810 is shown as being overlaid on the extracted boundary data of the portion 532 to illustrate the geo-spatial misalignment due to translation errors in the x-dimension and the y-dimension.

The adjustment parameters are estimated at block 430. In one embodiment, differences are computed for each corner of the extracted boundary data corresponding to the portion 532. For example, differences are computed between X1 and X1' to yield deltaX1 and between Y1 and Y1' to yield deltaY1. The values may be "signed" (e.g., positive or negative) to indicate a direction of the misalignment. Similarly, differences are computed for the other three (3) corners of plot 532. Also, differences are computed between the corners of the other three (3) plots (represented in the image 530) and the corresponding expected boundary data. Therefore, for the four (4) plots represented in the image 530, there are a total of sixteen (16) deltaX values and sixteen (16) deltaY values.

In accordance with one embodiment, a first adjustment parameter (APX) corresponding to the x-dimension is computed as an average of the minimum deltaX and the maximum deltaX among the sixteen (16) corners as follows:

APX=(minimum deltaX+maximum deltaX)/2.

Similarly, in accordance with one embodiment, a second adjustment parameter (APY) corresponding to the y-dimension is computed as an average of the minimum deltaY and the maximum deltaY among the sixteen (16) corners as follows:

APY=(minimum delta Y+maximum deltaY)/2.

Therefore, the estimated adjustment parameters APX and APY represent a geo-spatial misalignment of the translation type having a translation amount of APX in the x-dimension and a translation amount of APY in the y-dimension. By taking an average of the maximum and minimum translations in the x-dimension and the y-dimension when considering all sixteen (16) points, the extracted boundary data represented by the image 530 can be effectively centered with respect to the expected boundary data of the ground truth data to yield an overall minimum error between the two (e.g., at block 450). Other ways of estimating APX and APY are possible as well, in accordance with other embodiments. In accordance with one embodiment, the adjustment parameters are estimated by adjustment logic 130 of FIG. 1.

At block 440, metadata in a header of the acquired image data is modified to include the adjustment parameters (e.g., APX and APY). However, the actual acquired image data representing the spectral intensity levels and geo-spatial coordinates have not been changed at this point. In one embodiment, a record of the acquired image data with the modified header can be stored in the data cache as previously discussed herein. In accordance with one embodiment, the header of the acquired image data is modified by modification logic 135 of FIG. 1.

At block 450, the adjustment parameters (e.g., APX and APY) are applied to the acquired image data to generate corrected image data at corrected geo-spatial coordinates to mitigate the geo-spatial misalignment. For example, in the case of translation misalignment in the x-dimension and the y-dimension, the geo-spatial coordinates of each pixel of the acquired image data can be adjusted by APX and APY to place the pixels at corrected geo-spatial coordinates. In accordance with one embodiment, the adjustment parameters are applied to the acquired image data by correction logic 140 of FIG. 1.

Figure 9:
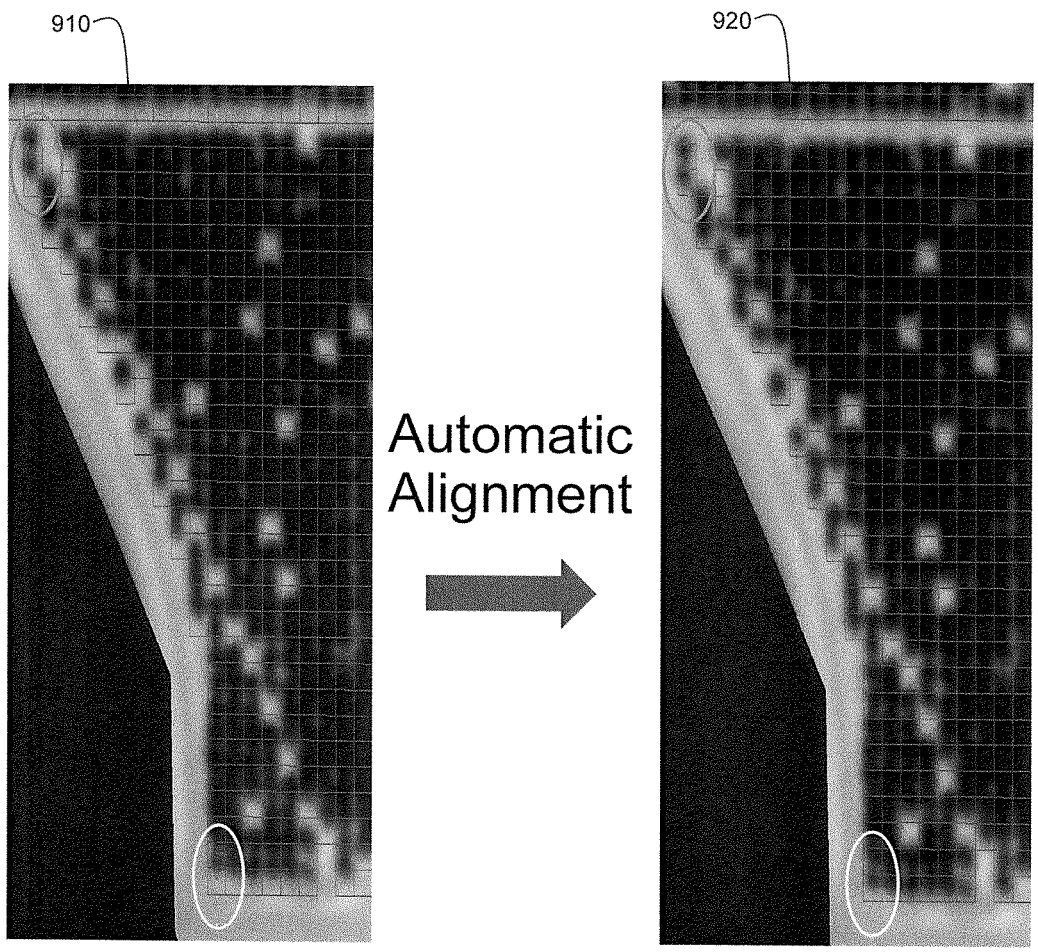
FIG. 9 illustrates one embodiment showing the results of performing an automatic alignment process using the system of FIG. 1 and the method of FIG. 4.

For example, FIG. 9 illustrates one embodiment showing the results of performing the automatic alignment process described herein. Image 910 shows a translation misalignment between acquired image data and grid data before the alignment process described herein is applied. Image 920 shows alignment between the acquired image data and the grid data after the alignment process described herein is applied. It can be seen in FIG. 9 that image 920 shows much better geo-spatial alignment between the cells of the grid data (ground truth data) and the trees (dark regions) of the acquired image data than does image 910.

At block 460, the corrected image data is analyzed to determine at least one environmental condition of the portion of the surface of the Earth represented by the acquired image data. As previously discussed herein, such environmental conditions may include drought conditions, inadequate crop growth conditions, traffic congestion conditions, pest conditions, deforestation conditions, fire conditions, and construction conditions. Other environmental conditions are possible as well, in accordance with other embodiments. In accordance with one embodiment, the analysis of the corrected image data is performed by analysis logic 145 of FIG. 1.

At block 470, control output data is generated based on the environmental condition(s) determined at block 460. At block 480, the control output data is communicated to at least one external mechanism to control the at least one external mechanism to modify the environmental condition(s) determined at block 460. The communication may be via wireless means (e.g., radio signals), in accordance with one embodiment. For example, when the environmental condition is a drought condition in part of a farm field, an irrigation system may be controlled via the control output data to water the farm field at the correct geo-spatial coordinates where the drought condition exists. Other external mechanisms may be controlled as well to modify other environmental conditions as previously discussed herein. In accordance with one embodiment, the control output data is generated and communicated to an external mechanism by control logic 150 of FIG. 1.

In this manner, the method 400 of FIG. 4 may be implemented on the location correction framework 110 of the computer system 100 of FIG. 1 to automatically correct geo-spatial errors in acquired aerial or satellite image data, automatically analyze the corrected image data to determine environmental conditions, and automatically control external mechanisms to modify the environmental conditions.

Computing Device Embodiment

Figure 10:
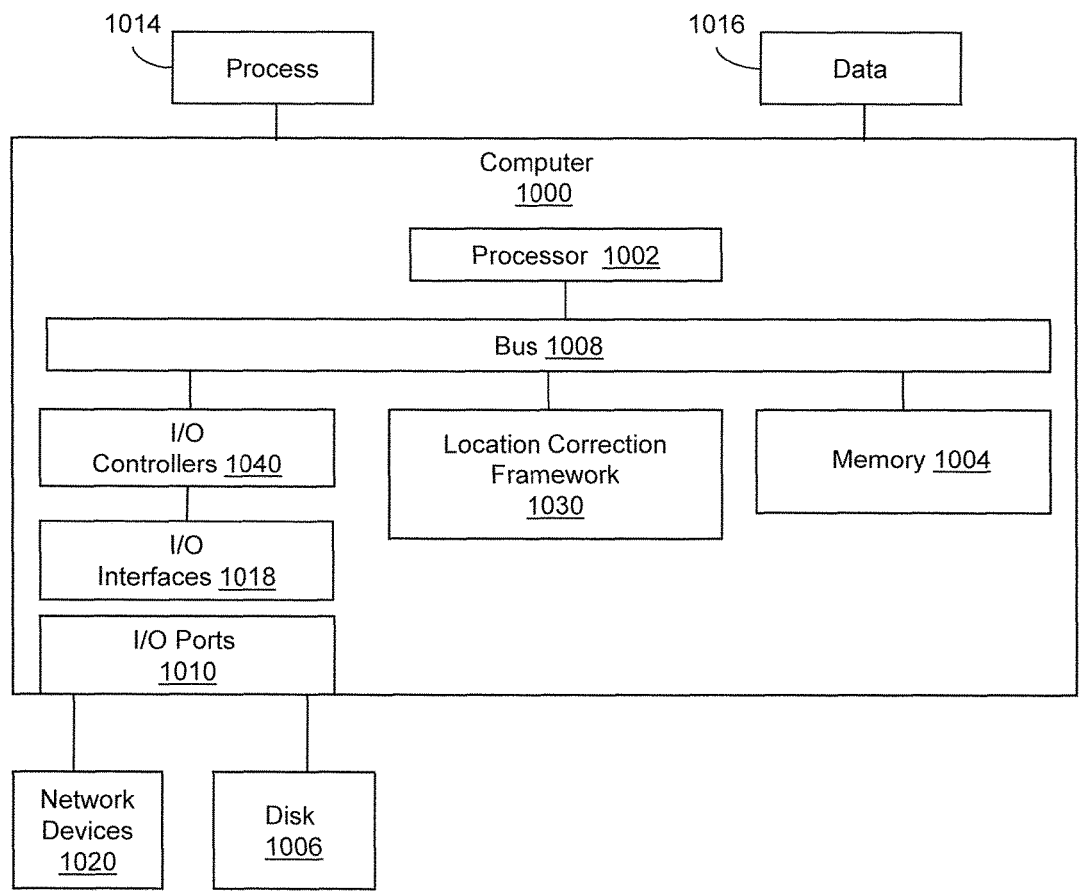
FIG. 10 illustrates one embodiment of a computing device upon which the location correction framework of a computing system may be implemented.

FIG. 10 illustrates an example computing device that is configured and/or programmed with one or more of the example systems and methods described herein, and/or equivalents. FIG. 10 illustrates one embodiment of a computing device upon which a location correction framework of a computing system may be implemented. The example computing device may be a computer 1000 that includes a processor 1002 and a memory 1004 operably connected by a bus 1008.

In one example, the computer 1000 may include a location correction framework 1030 (corresponding to location correction framework 110 from FIG. 1) which is configured to correct errors in geo-spatial coordinates of acquired image data. In different examples, the framework 1030 may be implemented in hardware, a non-transitory computer-readable medium with stored instructions, firmware, and/or combinations thereof. While the framework 1030 is illustrated as a hardware component attached to the bus 1008, it is to be appreciated that in other embodiments, the framework 1030 could be implemented in the processor 1002, a module stored in memory 1004, or a module stored in disk 1006.

In one embodiment, the framework 1030 or the computer 1000 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform geo-spatial coordinate correction and analysis of acquired image data. The means may also be implemented as stored computer executable instructions that are presented to computer 1000 as data 1016 that are temporarily stored in memory 1004 and then executed by processor 1002.

The framework 1030 may also provide means (e.g., hardware, non-transitory computer-readable medium that stores executable instructions, firmware) to generate control output data that controls an external mechanism to modify an environmental condition based on an analysis of the corrected image data.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A storage disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

Systems, methods, and other embodiments have been described that are configured to correct errors in the geo-spatial locations of acquired image data. In one embodiment, a data cache is configured to store acquired image data. The acquired image data is one of aerial image data or satellite image data representing features of a portion of the Earth's surface at incorrect geo-spatial coordinates. The data cache is also configured to store a set of ground truth data. The set of ground truth data represents the same features of the same portion of the Earth's surface, but at correct geo-spatial coordinates. Segmentation logic is configured to segment the acquired image data to generate extracted boundary data. The extracted boundary data represents boundaries of the features at the incorrect geo-spatial coordinates. Matching logic is configured to match the extracted boundary data to expected boundary data derived from the set of ground truth data. The expected boundary data represents the boundaries of the features at the correct geo-spatial coordinates. Adjustment logic is configured to estimate adjustment parameters. The adjustment parameters represent an amount and a type of geo-spatial misalignment between the extracted boundary data and the expected boundary data. Modification logic is configured to modify metadata in a header of the acquired image data to include the adjustment parameters. Correction logic is configured to apply the adjustment parameters to the acquired image data to generate corrected image data at corrected geo-spatial coordinates to mitigate the geo-spatial misalignment. Analysis logic is configured to analyze the corrected image data to determine an environmental condition of the portion of the Earth's surface. Control logic is configured to generate control output data based on the environmental condition, and control an external mechanism, by communicating the control output data to the external mechanism, to modify the environmental condition.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory, the method comprising:
    segmenting, via at least the processor, acquired image data to generate extracted boundary data, where the acquired image data is one of aerial image data or satellite image data representing features of a portion of the Earth's surface at incorrect geo-spatial coordinates, and where the extracted boundary data represents boundaries of the features at the incorrect geo-spatial coordinates, wherein the segmenting comprises:
        performing at least a thresholding operation on the acquired image data to generate binary image data;
        performing at least a morphological operation on the binary image data to generate noise-reduced image data; and
        performing at least an edge detection operation on the noise-reduced image data to generate the extracted boundary data;
    matching, via at least the processor, the extracted boundary data to expected boundary data derived from a set of ground truth data, where the expected boundary data represents the boundaries of the features at correct geo-spatial coordinates;
    estimating, via at least the processor, adjustment parameters representing an amount and a type of a geo-spatial misalignment between the extracted boundary data and the expected boundary data;
    applying, via at least the processor, the adjustment parameters to the acquired image data to adjust the acquired image data to generate a corrected image having corrected image data at corrected geo-spatial coordinates to mitigate the geo-spatial misalignment;
    analyzing, via at least the processor, the corrected image data to determine at least one environmental condition of the portion of the Earth's surface;
    generating, via at least the processor, control output data based on the at least one environmental condition; and
    controlling operation of a remote computer, at least by transmitting the control output data to the remote computer over a network, to control operation of a machine to modify the at least one environmental condition.

2. The method of claim 1, wherein the matching includes performing at least one of a nearest point process, a least-squares process, or a random sample consensus process to match the extracted boundary data to the expected boundary data.

3. The method of claim 1, wherein the controlling includes at least one of:
    controlling an irrigation system to apply water to crops at the corrected geo-spatial coordinates in a farm field, as represented by the corrected image data, to modify the environmental condition being that of drought;
    controlling an aerial drone to apply fertilizer to crops at the corrected geo-spatial coordinates in a farm field, as represented by the corrected image data, to modify the environmental condition being that of inadequate crop growth;
    controlling an aerial drone to apply a pesticide to crops at the corrected geo-spatial coordinates in a farm field, as represented by the corrected image data, to modify the environmental condition being that of insect infestation;
    controlling a traffic signal device to control traffic flow at the corrected geo-spatial coordinates on a heavily used road, as represented by the corrected image data, to modify the environmental condition being that of traffic congestion;
    controlling a law enforcement vehicle to navigate to the corrected geo-spatial coordinates in a forest, as represented by the corrected image data, to modify the environmental condition being that of illegal deforestation; and
    controlling a military aircraft to navigate to the corrected geo-spatial coordinates of an enemy site, as represented by the corrected image data, to modify the environmental condition being that of construction of an enemy military installation.

4. The method of claim 1, wherein the geo-spatial misalignment is due to a spatial translation error in the incorrect geo-spatial coordinates of the acquired image data.

5. The method of claim 1, wherein the geo-spatial misalignment is due to a spatial scaling error in the incorrect geo-spatial coordinates of the acquired image data.

6. The method of claim 1, wherein the geo-spatial misalignment is due to a spatial rotational error in the incorrect geo-spatial coordinates of the acquired image data.

7. The method of claim 1, wherein the geo-spatial misalignment is due to a spatial skewing error in the incorrect geo-spatial coordinates of the acquired image data.

8. The method of claim 1, further comprising modifying, via at least the processor, metadata in a header of the acquired image data to include the adjustment parameters.

9. The method of claim 1, wherein the incorrect geo-spatial coordinates of the acquired image data are one of global positioning system coordinates, latitude and longitude coordinates, or universal transverse mercator coordinates.

10. A computer system, comprising:
a processor connected to memory comprising instructions that when executed by the processor cause the processor to:
segment acquired image data to generate extracted boundary data, where the acquired image data is one of aerial image data or satellite image data representing features of a portion of the Earth's surface at incorrect geo-spatial coordinates, and where the extracted boundary data represents boundaries of the features at the incorrect geo-spatial coordinates, wherein the segmenting comprises:
performing at least a thresholding operation on the acquired image data to generate binary image data;
performing at least a morphological operation on the binary image data to generate noise-reduced image data; and
performing at least an edge detection operation on the noise-reduced image data to generate the extracted boundary data;
match the extracted boundary data to expected boundary data derived from a set of ground truth data, where the expected boundary data represents the boundaries of the features at correct geo-spatial coordinates;
estimate adjustment parameters representing an amount and a type of a geo-spatial misalignment between the extracted boundary data and the expected boundary data;
apply the adjustment parameters to the acquired image data to adjust the acquired image data to generate a corrected image having corrected image data at corrected geo-spatial coordinates to mitigate the geo-spatial misalignment;
analyze the corrected image data to determine at least one environmental condition of the portion of the Earth's surface;
generate control output data based on the at least one environmental condition; and
control operation of a remote computer, at least by transmitting the control output data to the remote computer over a network, to control operation of a machine to modify the at least one environmental condition.

11. The computer system of claim 10, wherein the module is configured to perform at least one of a nearest point process, a least-squares process, or a random sample consensus process to match the extracted boundary data to the expected boundary data.

12. The computer system of claim 10, wherein the module includes:
an edge detection module stored in the non-transitory computer-readable medium including instructions that when executed cause the processor to perform at least an edge detection operation on the noise-reduced image data to generate the extracted boundary data.

13. The computer system of claim 12, wherein the at least one external mechanism includes one of:

an irrigation system configured to apply, in response to the control output data, water to crops at the corrected geo-spatial coordinates in a farm field, as represented by the corrected image data, to modify the environmental condition being that of drought;
an aerial drone configured to apply, in response to the control output data, fertilizer to crops at the corrected geo-spatial coordinates in a farm field, as represented by the corrected image data, to modify the environmental condition being that of inadequate crop growth;
an aerial drone configured to apply, in response to the control output data, a pesticide to crops at the corrected geo-spatial coordinates in a farm field, as represented by the corrected image data, to modify the environmental condition being that of insect infestation;
a traffic signal device configured to control, in response to the control output data, traffic flow at the corrected geo-spatial coordinates on heavily used roads, as represented by the corrected image data, to modify the environmental condition being that of traffic congestion;
a law enforcement vehicle configured to navigate to, in response to the control output data, the corrected geo-spatial coordinates in a forest, as represented by the corrected image data, to modify the environmental condition being that of illegal deforestation; and
a military aircraft configured to navigate to, in response to the control output data, the corrected geo-spatial coordinates of an enemy site, as represented by the corrected image data, to modify the environmental condition being that of construction of an enemy military installation.

14. The computer system of claim 10, further comprising a visual user interface module stored in the non-transitory computer-readable medium including instructions that when executed cause the processor to provide a graphical user interface that controls user selection of the acquired image data from the data cache in response to user commands.

15. The computer system of claim 14, further comprising a display screen configured to display and facilitate user interaction with at least the graphical user interface provided by the visual user interface module.

16. A non-transitory computer-readable medium storing instructions that, when executed by one or more processors of a computing device, cause the computing device to at least:
segment, via the one or more processors, acquired image data to generate extracted boundary data, where the acquired image data is one of aerial image data or satellite image data representing features of a portion of the Earth's surface at incorrect geo-spatial coordinates, and where the extracted boundary data represents boundaries of the features at the incorrect geo-spatial coordinates, wherein the segmenting comprises:
performing at least a thresholding operation on the acquired image data to generate binary image data;
performing at least a morphological operation on the binary image data to generate noise-reduced image data; and
performing at least an edge detection operation on the noise-reduced image data to generate the extracted boundary data;
match, via the one or more processors, the extracted boundary data to expected boundary data derived from a set of ground truth data, where the expected boundary data represents the boundaries of the features at correct geo-spatial coordinates;

estimate, via the one or more processors, adjustment parameters representing an amount and a type of a geo-spatial misalignment between the extracted boundary data and the expected boundary data;

apply, via the one or more processors, the adjustment parameters to the acquired image data to adjust the acquired image data to generate a corrected image having corrected image data at corrected geo-spatial coordinates to mitigate the geo-spatial misalignment;

analyze, via the one or more processors, the corrected image data to determine at least one environmental condition of the portion of the Earth's surface;

generate, via the one or more processors, control output data based on the at least one environmental condition; and control, via the control output data, at least one external mechanism to modify the at least one environmental condition.

17. The non-transitory computer-readable medium of claim 16, wherein the instructions further comprise instructions that, when executed by the one or more processors, cause the computing device to at least:

modify, via the one or more processors, metadata in a header of the acquired image data to include the adjustment parameters.

18. The non-transitory computer-readable medium of claim 16, wherein the incorrect geo-spatial coordinates of the acquired image data are one of global positioning system coordinates, latitude and longitude coordinates, or universal transverse Mercator coordinates.

* * * * *